United States Patent [19]

Zichner et al.

[11] Patent Number: 5,221,121
[45] Date of Patent: Jun. 22, 1993

[54] REINFORCEMENT ELEMENT FOR THE BODY OF AN AUTOMOBILE

[75] Inventors: Roland Zichner, Obereuerheim; Manfred Janssen, Krefeld; Ulrich Hoffmann, Duisburg, all of Fed. Rep. of Germany

[73] Assignee: Mannesmann Aktiengesellschaft, Dusseldorf, Fed. Rep. of Germany

[21] Appl. No.: 771,606

[22] Filed: Oct. 4, 1991

[30] Foreign Application Priority Data

Oct. 4, 1990 [DE] Fed. Rep. of Germany ....... 4031678

[51] Int. Cl.⁵ .......................... B60J 5/04; B60R 19/00
[52] U.S. Cl. ...................................... 296/188; 49/502; 52/223.12; 267/64.15; 267/64.28; 296/146 C; 296/189
[58] Field of Search ........... 296/188, 189, 146, 146 C; 49/501, 502; 267/64.15, 64.28; 52/223 R, 225

[56] References Cited

U.S. PATENT DOCUMENTS

| | | | |
|---|---|---|---|
| 3,700,076 | 10/1972 | Forsting et al. | 188/371 |
| 4,708,390 | 11/1987 | Palentyn et al. | 296/188 |
| 4,796,946 | 1/1989 | Wilson et al. | 296/199 X |
| 4,919,473 | 4/1990 | Laimighofer et al. | 296/188 |

FOREIGN PATENT DOCUMENTS

| | | | |
|---|---|---|---|
| 302044 | 2/1989 | European Pat. Off. | 296/188 |
| 2006498 | 9/1971 | Fed. Rep. of Germany | 296/188 |
| 3703021 | 8/1988 | Fed. Rep. of Germany | 296/188 |

Primary Examiner—David M. Mitchell
Assistant Examiner—Andrew C. Pike
Attorney, Agent, or Firm—Cohen, Pontani, Lieberman, Pavane

[57] ABSTRACT

A reinforcement element, for the body of an automobile, consists of an elongated tensile elastic part comprising a cable, which is arranged in a hollow section attached to the body of the automobile. The cable extends through the hollow section and is attached by its ends independently of the hollow section to an attachment point on a part of the body. An impact against the body part causes the hollow section to contact and rest against the cable, such that the cable impedes further displacement of the hollow section with respect to the body. The cable may be a compound cable, each element having different routing, lengths, thicknesses, and/or construction. The mounting includes a tensioning element to prestress the cable, and may include a passive or active damping element.

2 Claims, 2 Drawing Sheets

REINFORCEMENT ELEMENT FOR THE BODY OF AN AUTOMOBILE

FIELD OF THE INVENTION

The present invention relates to a reinforcement element for the body of an automobile, in particular a door of a passenger car.

BACKGROUND OF THE INVENTION

Door reinforcements serve as stiffners for automobile doors in order to absorb impact energy in the event of a lateral impact, and convert it into mechanical work which is dissipated. In this manner, passengers in a car can be protected from injury.

In the course of increasing the inherent safety of automobiles via such passive measures, reinforcement elements must be installed at certain places of the automobile body, in particular, the door of a passenger car, in order to improve the crash behavior.

A door reinforcement of this type is known from Federal Republic of Germany Paten Document OS 36 06 024. The rectangular, preferably square, hollow section, with bead portions which extend outward at both ends on the inner and outer flanges, if formed from an extruded section of light metal. That reinforcement element is formed as a load-bearing member which is fastened at both ends in the automobile door. However, this nearly square section is unsuitable for narrow body parts, such as narrow automobile doors which have a small depth available for installation and retention of the reinforcement, which may have other components which interfere with the placement of the reinforcement. It is, furthermore, difficult to adapt such a design for various structurally different automobile doors or body parts.

Another proposal for reinforcing an automobile door is present in Federal Republic of Germany Patent 31 02 328. In that structure, the door is assembled containing a load-bearing part constructed of plastic, in which an irreversibly stretchable cable extends, the ends of which are attached at the same point of articulation as the load bearing part. Thus, the cable may absorb an energy of impact by being stretched beyond its yield point.

OBJECTS OF THE PRESENT INVENTION

It is an object of the present invention to provide an improved reinforcement element which can be used in different parts of the body of an automobile, and by means of which the crash behavior of the automobile is improved, providing increased safety for the occupants thereof.

It is a further object of the present invention to provide a reinforcement element, for the body of an automobile, comprising an elongated tensile elastic part comprising a cable which is arranged in a hollow section attached to the body of the automobile, wherein said cable extends through the hollow section and is attached independently thereof, to an attachment point on a part of the body, whereby an impact of a mass against the body may cause the hollow section to contact said cable, such that said cable impedes further displacement of the hollow section with respect to the body.

It is a still further object of the present invention that the cable may be a compound cable comprising a plurality of cables, each of which may independently differ in placement, length, thickness, material, processing, and the like.

It is another object of the present invention to provide, within a hollow space in an automobile body structure, a cable equipped with a tensioning element for imparting a prestress.

Another embodiment of the present invention has as its object to provide a damping means attached to the cable, whereby movement of the cable end with respect to the attachment point causes dissipation of energy within the damping means.

Another object of the invention provides a damping means for dissipating energy from the movement of the cable, and a gas cartridge and an enclosed space as a part of the damping means, whereby exhaust of gas from the gas cartridge into the enclosed space impedes movement of said cable with respect to the attachment point due to impact.

SUMMARY OF THE INVENTION

In the known methods of reinforcing automobile bodies or other structures which provide a shell, subject to deforming impact, the main emphasis has, up to now, been placed on the plastic behavior of the reinforcement means. Plastic deformation, however, always entails a corresponding elongation, which means that the automobile body part which is deformed upon a crash may protrude far into the passenger space, and lead to injuries of the passengers. The present invention proposes a different solution, providing an elongated, elastic tensile part, the ends of which can be attached to the body or body part. This reinforcement element is preferably formed from a cable or a compound cable which is, for instance, wire, plastic, or hemp. This cable or compound cable is attached at each of its ends to the automobile body, for instance, by means of cable clamps. The reinforcement cable has associated with it a tensioning element, such as a turnbuckle, which is provided for pretensioning the cable.

This reinforcement structure results in the advantage that it takes up only a small amount of space in the body element and can be simply adapted to reside in many different parts of the body. Furthermore, such an element has a very small weight so that the increase in weight due to the presence of the reinforcement structure is negligibly small, compared to the total weight of the vehicle. The present elastic reinforcement elements differ from the prior rigid reinforcement elements, in that there are no bending stresses which may result in the creation of destructive forces.

In accordance with the invention, the reinforcement element extends through a hollow body section and is attached to the body independently from that hollow body section. This is advantageous because, during a crash or impact, the deformation takes place in a number of phases or stages. The hollow body section is initially plastically deformed by the impact, until such time as it contacts or comes to rest against the elastic reinforcement element. Further plastic deformation or buckling of the hollow body section is greatly impeded, if not fully suppressed, by the elastic reinforcement element, which provides a counterforce against the inner surface of the part. As a further embodiment of the present invention, the cable structure is constructed of several individual cable elements formed of the same or different materials. These cable elements may additionally vary in length, thickness, fabrication treatment, pretension, or other parameters to produce the desired effect. Thus, it is seen that, if the reinforcement member acts to absorb the impact while protecting the occupants of the vehicle, it may be desired to have a progressive increase in force per unit deformation of the hollow body element. Initially, the hollow body element would deform according to its own characteristics, until it rests against another element, namely the reinforcement cable. Further deformation occurs according to the combined characteristics of the hollow body element and the reinforcement element, which is elastic, and therefore tends to have a linear force per unit distance characteristic. However, if the cable has elements with different characteristics, then a nonlinear result may be obtained. For example, if a compound cable has elements which are prestressed and those that are not, then the force-displacement relationship will be nonlinear, and will progressively increase as elements become stressed. Further, as cable elements reach their yield points, the force-distance relationship will become nonlinear.

The mechanism is approximately comparable to that described above, wherein the individual cable elements are not forcefully engaged simultaneously, but rather successively. In this way, long deformation paths can be realized and the hollow body element to be reinforced is not excessively stressed since the shorter and/or thinner or less strong cable elements tear under a given load, thus effectively transferring the load bearing function to other element within the reinforcement structure.

In a cable type reinforcement, the impact absorbing effect may be enhanced by providing mountings for the cables or compound cables which further act to dampen the impact or absorb the impact energy. Further, it is seen that the cables should be mounted in such fashion that the impact does not cause the cable to be circumvented as an impact absorbing and safety element by failure, breakage, or destruction of the mounting elements, and also be mounted at such locations that allow the reinforcement structure to protect zones around the passenger compartment, where the likelihood of impact and passenger injury is great.

Of course, it should be realized that the hollow body element need not simply deform under impact, and may posses desirable impact absorbing properties that may act independently of the reinforcing element, or may even provide a synergism. However, it is obvious that the present invention operates in an environment in which a deformable member is subject to an impact which is to be absorbed, and the present reinforcement acts to prevent intrusion of the impacting mass into the space behind the reinforcement by both elastic deformation and/or irreversible processes.

BRIEF DESCRIPTION OF THE DRAWINGS

Embodiments of the reinforcement element of the present invention will be explained further with reference to the drawings, in which.

DETAILED DESCRIPTION OF THE PREFERRED EMBODIMENTS

Figure 1:
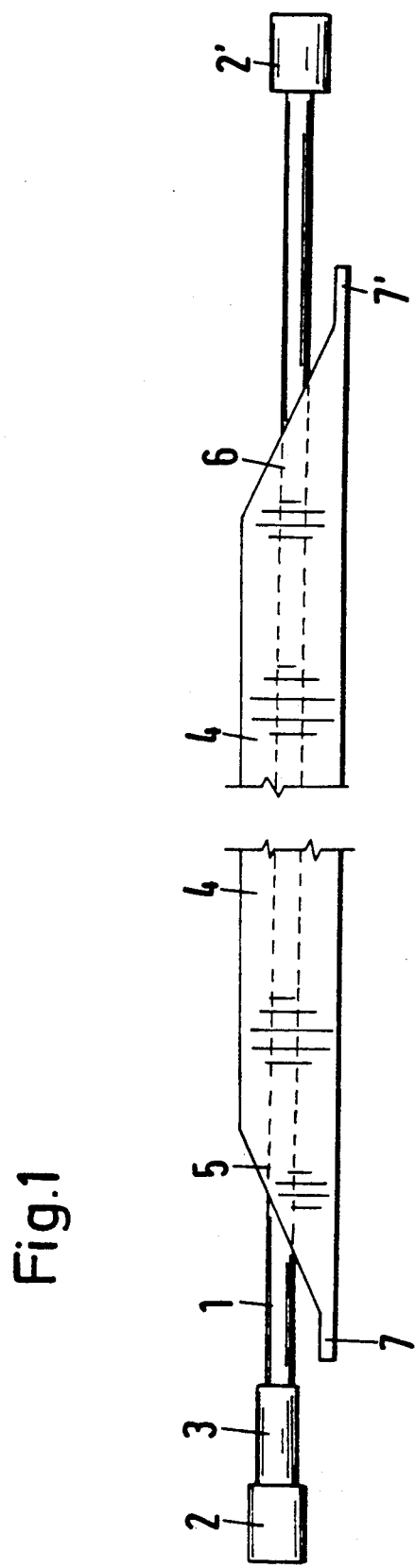
FIG. 1 is a frontal view of an arrangement of the reinforcement element of the present invention.

FIG. 1 shows, in frontal view, an embodiment of the reinforcement element of the invention. It consists of a steel cable 1 anchored in cable clamps 2, 2' and a tensioning element 3. Cable clamps 2, 2' and tensioning element 3 which may be, for instance, a turnbuckle, or other known means for applying a prestress to a cable, and are merely diagrammatically indicated. The thickness of the steel cable 1 has been exaggerated for greater clarity. The reinforcement element is arranged in a box-shaped hollow section 4, which is beveled in known manner at its ends 5, 6 in order, for instance, to be attached to an automobile door, not shown. In order to facilitate assembly, the end regions of the hollow section 4 are formed into tabs 7, 7'. The ends 5, 6 are open regions of the hollow section 4 which are present at the bevelled portion to facilitate the arrangement of the reinforcement means so that the entire part can be preassembled, ready for installation in, for example, an automobile door.

The hollow section 4 and the steel cable 1 are attached independently of each other to a body part (no shown), for instance an automobile door. The advantage of this arrangement resides in the fact that the hollow section 4 is plastically deformed before it comes to rest against the prestressed steel cable 1. Further deformation is impeded by the elasticity of the steel cable 1, which provides a counterforce against the impacting mass.

Figure 2:
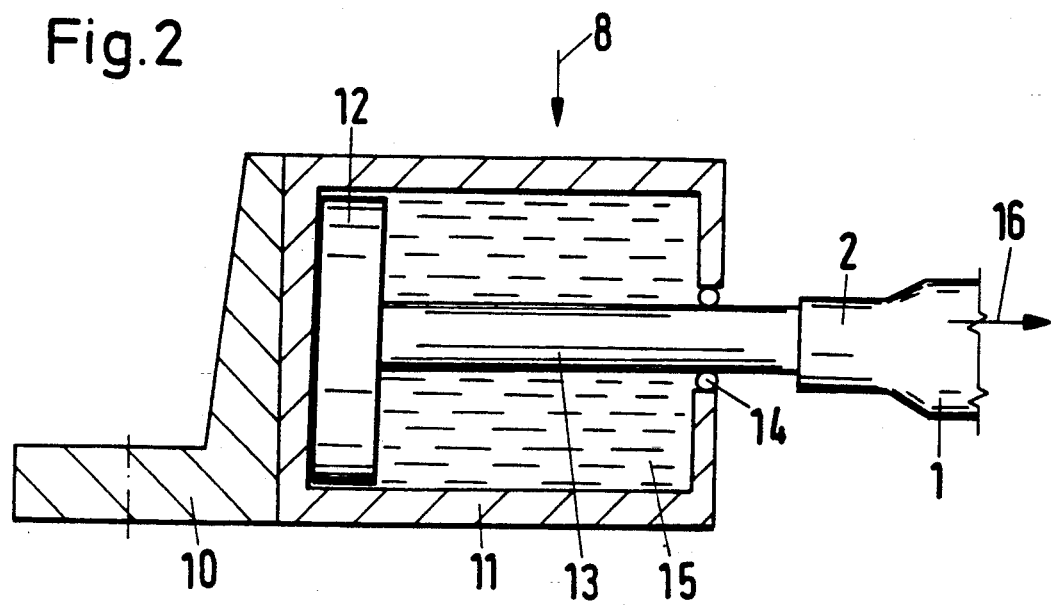
FIG. 2 is a partial cross-sectional view through a damping element with part of the housing cut away for greater clarity.
Figure 3:
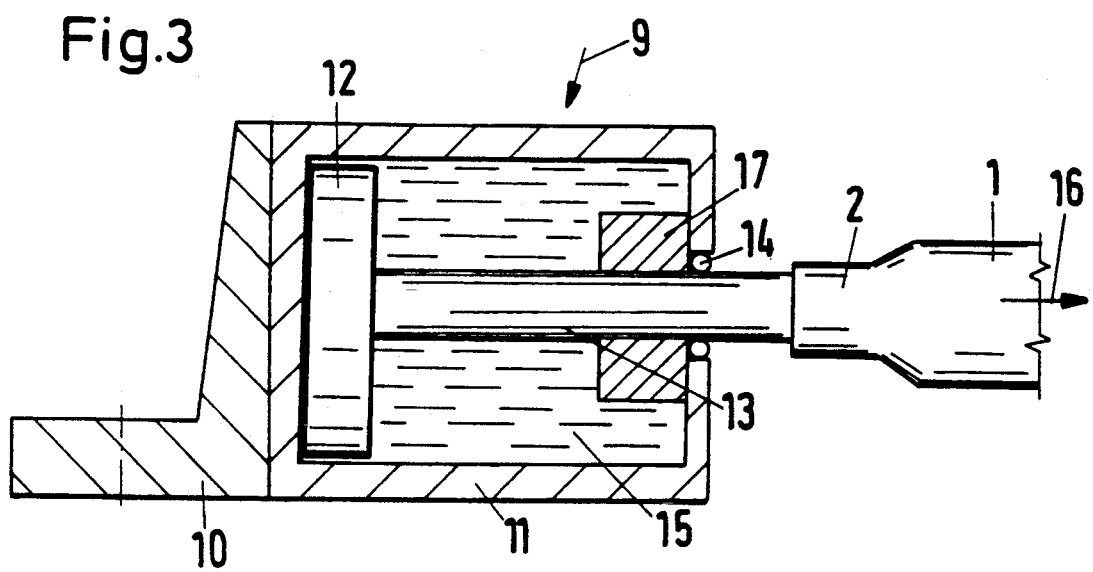
FIG. 3 is another embodiment of the damping element of FIG. 2 also in partial cross-sectional view with part of the housing cut away for greater clarity.

FIGS. 2 and 3 show a second and third embodiment of the present invention, in each case shown in partial cross-sectional view with the housing removed for sake of clarity. The steel cable 1 which is connected to a damping element 8, 9. The steel wire cable 1 is shown only in part to indicate its location. The damping elements 8, 9 are used in place of the turnbuckle 3, shown in FIG. 1, and perform an analogous function, i.e. to adjust the tension on the cable 1. The damping elements 8, 9 consist of a holding pedestal 10, a cylinder 11, and a piston 12 with piston rod 13. The piston rod 13 extends from the cylinder 11 through a seal 14 and is attached to a cable clamp 2, which fixably holds the wire cable 1. The inside of the cylinder 11 is filled with a fluid 15, which may be a liquid or a gas. In the case of an impact, the wire cable 1 is displaced so that the piston rod 13 is withdrawn from the cylinder 11, towards the right in FIGS. 2 and 3, indicated by the arrow 16. The piston 12 is mounted to the piston rod 13, so that it too tends to be withdrawn. This piston structure acts as a damper, and work is performed in displacing the fluid 15, and thus impact energy is absorbed and turned into heat by the withdrawal of the piston 12 from the cylinder 11.

The embodiment shows in FIG. 3 has, as a further element, in addition to the fluid 15 in the cylinder 11, a gas cartridge 17 arranged in the inside of the cylinder. The gas cartridge 17 is opened or vented, upon the movement of the wire cable 1, so that the gas stored therein is exhausted and can expand in the closed space of the cylinder 11. In this way, the effect of the absorption of impact energy by piston work is reinforced. It is noted that, instead of being a simple compressed gas cartridge, an explosive device may be present, containing, for example, sodium oxide or the like, which may be detonated mechanically or electronically. Such a device is more efficient in storing the materials of the gas prior to impact, and may exhaust more quickly. This would operated similarly to the "air bag" passive restraint devices present in many automobiles, and are known to those skilled in the art. In fact, if such devices were present, they could not only provide impact reinforcement for the vehicle body structure, but also be associated with an airbag to cushion the occupants of the vehicle, triggered by the same mechanism.

The gas cartridge 17, when it vents, increases the pressure and provides a compressible medium in the space behind the piston 12. Thus, in this embodiment, the function of the mounting is to actively tighten the cable during impact. Thus, when a force is exerted on the wire cable 1, it is transmitted through the cable clamp 2 and the piston rod 13, to the piston 12. This force tends to withdraw the piston 12 from the cylinder 11 of the damping element 9, against the fluid 15 contained therein. The movement of the piston rod 13 causes the gas cartridge 17 to vent, for example, by uncovering a port therein or by other known means. The rapid expansion of the gas within the cylinder 11 creates a force which opposes the further movement of the piston 12. This gas also provides a pneumatic damper which absorbs the work applied to the cable, and creates heat therefrom. Further, such an arrangement provides two other advantages. First, since the impact is more gradually absorbed by the pneumatic cushion, the remainder of the structure is subjected to a lower impulse, and may absorb the impact in a more controlled fashion, with a lower peak stress. Second, the venting of the gas cylinder acts 17 as a "pretensioning" element for the cable, so that, in case the tension on the wire cable 1 has relaxes from the date of manufacture or servicing, its function may still remain intact. Other advantages may also accrue, such as an enhanced sealing of the cylinder 22 chamber by the seal 14.

Figure 4:
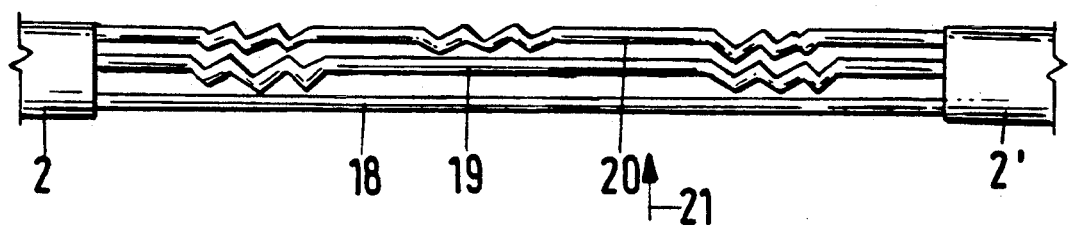
FIG. 4 is a plan view of a compound cable of the present invention.

FIG. 4 shows a compound cable of the invention diagrammatically in plan view. It consists of several cable elements 18, 19, 20 which may have various characteristics, and may individually differ in material, length, and thickness. The impact energy acting on the compound cable is indicated by the arrow 21. In accordance with FIG. 4, the first cable element 18 would tear (or stretch) first under the action of the impacting load while the second cable element 19 would tighten. Then, as the impacting mass moves further in the direction of arrow 21, the cable 19 would tear or stretch so that the cable 20 becomes engaged. Of course, there may be any number of cables having different properties, and the mechanism would proceed analogously. Thus, of the plurality of cables present in this embodiment, any two may have different length, gauge, material characteristics, placement or routing within the door, and/or mounting means.

The advantage of this multiple cable arrangement resides in the fact that the impact energy is absorbed step by step, and the parts of the automobile body to be protected, and the points of attachment of the reinforcement means, are not abruptly stressed by maximum impact load value.

It should be understood that the preferred embodiments and examples described above are for illustrative purposes only and are not to be construed as limiting the scope of the present invention, which is properly delineated only in the appended claims.

What is claimed is:

1. A reinforcement element for a vehicle body to be reinforced, comprising:
   a hollow member including an elongated hollow profile;
   a first mounting means for mounting said hollow member within the vehicle body;
   an elongated tensile elastic element arranged within and extending through said hollow member, said elongated tensile elastic element has an end, said reinforcement element further comprising a damping means attached to said end for impeding movement thereof with respect to the vehicle body and for dissipating work when said tensile elastic element is displaced with respect to the vehicle body, said damping means comprising a gas cartridge and an enclosed space, whereby exhaust of gas from said gas cartridge into said enclosed space impedes movement of said end with respect to the vehicle body; and
   second mounting means for mounting said elongated tensile elastic element within the vehicle body, said second mounting means including means for mounting said elongated tensile elastic element to said vehicle body independently from said hollow member such that when a deformation force directed against said hollow member causes said hollow member to be displaced with respect to the vehicle body, said elongated tensile elastic element will impede further displacement of said hollow member with respect to the vehicle body.

2. A method of reinforcing a body of an automobile against an impact to a part of the body having a hollow member attached therewithin, comprising:
   mounting an elongated tensile elastic element in the hollow member so that the tensile elastic element extends through the hollow member and is attached independently thereof to an attachment point on the automobile body;
   damping a movement of the tensile elastic element with respect to the body as a result of the contact between the hollow member and the tensile elastic element, with a damping means, such that work is dissipated within the damping means when the tensile elastic element is moved; and
   exhausting gas from a gas cartridge into an enclosed space upon the movement of the tensile elastic element, whereby the movement of the tensile elastic element is impeded with respect to the body, such that when a mass impacts against the body and causes the hollow member to be displaced with respect to the body and to contact the tensile elastic element, the tensile elastic element will impede further displacement of the hollow member with respect to the body.

* * * * *